United States Patent
Zhang et al.

(10) Patent No.: US 12,276,236 B2
(45) Date of Patent: Apr. 15, 2025

(54) ENERGY STORAGE METHOD AND DEVICE FOR BIOMASS CASCADE PYROLYSIS COUPLED WITH NEW ENERGY POWER GENERATION

(71) Applicant: SOUTHEAST UNIVERSITY, Nanjing (CN)

(72) Inventors: Huiyan Zhang, Nanjing (CN); Yinhai Su, Nanjing (CN); Bo Peng, Nanjing (CN); Sheng Chu, Nanjing (CN); Yujie Tao, Nanjing (CN); Qi Cao, Nanjing (CN); Rui Xiao, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 18/957,936

(22) Filed: Nov. 25, 2024

(65) Prior Publication Data

US 2025/0084805 A1    Mar. 13, 2025

Related U.S. Application Data

(63) Continuation of application No. PCT/CN2022/133351, filed on Nov. 22, 2022.

(30) Foreign Application Priority Data

May 26, 2022   (CN) .......................... 202210584155.9

(51) Int. Cl.
   *C10K 1/04*      (2006.01)
   *F02G 5/04*      (2006.01)

(52) U.S. Cl.
   CPC ...................... *F02G 5/04* (2013.01)

(58) Field of Classification Search
   CPC ........... C10K 1/04; C10B 57/10; C10B 53/02; C10B 19/00; C10B 27/00; C10B 7/10;
   (Continued)

(56) References Cited

U.S. PATENT DOCUMENTS

2008/0099325 A1   5/2008  Ludlow-Palafox et al.
2008/0149471 A1*  6/2008  Wolfe .................... F23G 5/0273
                                                               201/8
(Continued)

FOREIGN PATENT DOCUMENTS

CN       201276417 Y    7/2009
CN       101956665 A    1/2011
(Continued)

OTHER PUBLICATIONS

English Translation CN111978971A (Year: 2020).*
English Translation JP-2019193358-A (Year: 2019).*

*Primary Examiner* — Shafiq Mian
(74) *Attorney, Agent, or Firm* — Bayramoglu Law Offices LLC

(57) ABSTRACT

The provided is energy storage method and device for biomass cascade pyrolysis coupled with new energy power generation. The key point of the technical solution is that, with inexpensive, clean and safe biomass as energy storage medium, the redundant unstable electric energy is converted by a cascade pyrolysis energy storage system into an easy-to-store liquid and solid chemical energy in biomass pyrolytic products, and based on use requirements, can be further converted into clean fuels for power generation or exported renewable chemicals, so as to realize continuous stable output of the new energy power generation systems. Furthermore, the cascade pyrolysis energy storage system can, based on the principle of "energy level matching", fully recover and utilize the electric energy, high-temperature heat energy and low-temperature heat energy generated in pyrolysis processes, thereby maximizing the energy utilization efficiency of the system.

7 Claims, 3 Drawing Sheets

(58) Field of Classification Search
CPC .. C10B 49/02; C10G 1/02; C10G 1/00; C10G 2300/1011; F23G 7/06; B01J 19/126; Y02E 50/10

See application file for complete search history.

(56) References Cited

U.S. PATENT DOCUMENTS

| | | | |
|---|---|---|---|
| 2010/0138062 A1* | 6/2010 | Zheng | F03D 9/20 |
| | | | 700/291 |
| 2010/0170147 A1* | 7/2010 | McNeff | C10L 1/026 |
| | | | 44/605 |
| 2011/0214343 A1* | 9/2011 | Wechsler | C10L 5/447 |
| | | | 422/198 |
| 2022/0115682 A1* | 4/2022 | Allinson | C25B 15/081 |
| 2024/0191639 A1* | 6/2024 | O'Donnell | C10G 9/20 |

FOREIGN PATENT DOCUMENTS

| | | | | |
|---|---|---|---|---|
| CN | 104261649 A | | 1/2015 | |
| CN | 104654576 A | | 5/2015 | |
| CN | 110492188 A | | 11/2019 | |
| CN | 111978971 A | * | 11/2020 | ............ B01J 19/126 |
| CN | 112174469 A | | 1/2021 | |
| CN | 112523918 A | | 3/2021 | |
| CN | 212671885 U | | 3/2021 | |
| CN | 113247979 A | | 8/2021 | |
| CN | 113939578 A | | 1/2022 | |
| CN | 114989840 A | | 9/2022 | |
| JP | 2019193358 A | * | 10/2019 | |
| WO | 2001018152 A1 | | 3/2001 | |

\* cited by examiner

ENERGY STORAGE METHOD AND DEVICE FOR BIOMASS CASCADE PYROLYSIS COUPLED WITH NEW ENERGY POWER GENERATION

CROSS-REFERENCE TO THE RELATED APPLICATIONS

This application is a continuation application of International Application No. PCT/CN2022/133351, filed on Nov. 22, 2022, which is based upon and claims priority to Chinese Patent Application No. 202210584155.9, filed on May 26, 2022, the entire contents of which are incorporated herein by reference.

TECHNICAL FIELD

The present disclosure relates to the field of new energy storage technologies and in particular to energy storage method and device for biomass cascade pyrolysis coupled with new energy power generation.

BACKGROUND

Along with the rapid development of human technologies, there is an ever-increasing need for fossil energy. However, there is a potential risk of energy depletion in the use of the fossil energy, and the over-exploitation and utilization also brings increasingly severe environmental pollution. For the purpose of meeting the requirements of energy safety and sustainable development, promoting renewable energy development and improving the existing energy structure have become the main target various governments try to pursue in recent years. Since the new century, China has witnessed stable growth in renewable energy power generation. By 2021, China reached as high as 652.6 billion kWh in annual wind power generation, accounting for about 7.9% of the total electricity consumption of the whole society of the year; and reached 325.9 billion kWh in photovoltaic power generation, accounting for about 3.9% of the total electricity consumption of the whole society. But the randomness and fluctuation of the wind energy and the solar energy result in continuous fluctuation in power and frequency of the new energy power output. The low electricity quality results in higher requirements for the flexibility and safe and stable operation of the power grids. Meanwhile, the use of the electricity has the phenomenon of valley and peak and cannot match the time sequence of the new energy power generation. Finally, the new energy power generation cannot be consumed in time due to the power requirements and the operation safety of the power grids, bringing power waste.

In order to deal with the possible impact of the large-scale connection of the new energy power generation on the power grids, on the one hand, the traditional power generation modes such as thermal power generation and hydropower generation and the like are required to play a fundamental role in the joint peak adjustment; more importantly, the energy storage technology is introduced to increase the flexibility of the power supply end. The common energy storage modes include the electrochemical energy storage disclosed in the patent CN 110492188 A, the pumped energy storage disclosed in the patent CN 112523918 A, and the compressed air energy storage disclosed in the patent CN 212671885 U and the like. But, for those large-scale wind power and photovoltaic new energy bases, there are some technical difficulties with the above technologies. For example, the electrochemical energy storage has the disadvantages of high costs, short service life, and potential fire risk, the pumped energy storage has the disadvantages of low efficiency and high susceptibility to geographical location, and the compressed air energy storage has the disadvantages of need for a heat radiation system, and the like. Due to the shortcomings of the existing solutions, an inexpensive, reliable and highly-adaptive novel energy storage mode is required.

It is noted that there is a huge quantity of inexpensive biomass resource distributed across China. Pyrolysis is a common biomass utilization mode, in which under an inert atmosphere, the heat energy is used to cut off the chemical bonds of macromolecular compounds of the biomass so as to convert the biomass resource into products containing chemical energy, such as bio-char, bio-oil and pyrolytic gas and the like. It is necessary to seek a more feasible technical route for the consumption of the new energy power generation, in which the biomass pyrolysis technology is introduced to the energy storage field and the biomass pyrolysis is driven by new energy power generation so as to store the un-consumable electric energy into the pyrolytic product in the form of stable chemical energy, and further provide the stable controllable electric energy to the power grid based on requirements to realize stable, controllable and continuous output of the new energy power generation with a reduced impact on the power grid, or convert it into renewable chemicals for export.

SUMMARY

The present disclosure provides energy storage method and device for biomass cascade pyrolysis coupled with new energy power generation, with its technical purpose of realizing, by using biomass pyrolysis technology, storage and utilization on redundant unstable electric energy generated by new energy power generation.

The above technical purpose of the present disclosure is implemented by the following technical solution.

There is provided an energy storage device for biomass cascade pyrolysis coupled with new energy power generation, which includes a feeding system, a cascade pyrolysis system, a post-treatment system and an output system.

The feeding system includes a biomass feedstock bin, a feedstock-conveying device, a first gas locker and a second gas locker sequentially connected.

The cascade pyrolysis system includes a low-temperature pyrolysis device and a high-temperature pyrolysis device; the low-temperature pyrolysis device is connected with a heat transfer oil storage box.

The post-treatment system includes a condensation system, a power generation system, and an exhaust treatment device.

The output system includes a high-temperature storage bin and a low-temperature storage bin, and several devices are added based on different final purposes; when the purpose is to realize stable output of the electric energy of the new energy power generation, a mixing device is provided; when the purpose is to consume redundant electric energy of the new energy power generation, a nitrogen making device is provided.

The electric energy required by various systems of the energy storage device is supplied by a new energy power generation system and specifically includes a mechanical energy, a heat energy and an electric energy required by various systems.

A second gas locker of the feeding system is connected to an inlet of the low-temperature pyrolysis device; a low-temperature bio-char outlet of the low-temperature pyrolysis device is connected with an inlet of the high-temperature pyrolysis device, and a low-temperature pyrolytic gas outlet is connected with an inlet of the condensation system.

The low-temperature pyrolysis device performs pyrolysis by heating of a heat transfer oil, and the high-temperature pyrolysis device performs pyrolysis by microwave. A jacket layer of a housing of the low-temperature pyrolysis device and a feed screw are hollow structures, and thus both are used to introduce a circulating heat transfer oil. The high-temperature pyrolysis device has a housing with a heat insulation layer, and a microwave generator embedded on the housing performs deep pyrolysis on a pre-pyrolysed char delivered by the low-temperature pyrolysis device. An outlet of the high-temperature pyrolysis device is connected with the high-temperature storage bin of the output system, and an outlet of the high-temperature storage bin is connected with an inlet of the low-temperature storage bin.

The condensation system includes a first gas-liquid heat exchanger, a second gas-liquid heat exchanger, a spray tower heat exchanger and a gas storage tank; the power generation system includes a booster fan, an internal combustion engine and a power generator; an outlet of the first gas-liquid heat exchanger is connected with an inlet of the spray tower heat exchanger; a bottom liquid outlet of the spray tower heat exchanger is connected with the output system, and a top gas outlet is connected with an inlet of the gas storage tank; an outlet of the gas storage tank is connected with an inlet of the booster fan; an outlet of the booster fan is connected with the internal combustion engine; the internal combustion engine is connected with the power generator; the power generator supplies power to the high-temperature pyrolysis device.

Further, a low-temperature pyrolytic gas outlet of the low-temperature pyrolysis device is connected with an inlet of the spray tower heat exchanger or the second gas-liquid heat exchanger.

Further, a high-temperature pyrolytic gas outlet of the high-temperature pyrolysis device is connected with an inlet of the first gas-liquid heat exchanger.

Further, an exhaust of the internal combustion engine sequentially flows through the low-temperature pyrolysis device and the biomass feedstock bin for recovery of heat energy in the exhaust and finally is discharged after being treated by the exhaust treatment device.

Further, a high-temperature heat source of the high-temperature storage bin is recovered to the low-temperature pyrolysis device, and a low-temperature heat source of the low-temperature storage bin is recovered to dry and preheat a raw biomass feedstock in the biomass feedstock bin.

Further, the heat energy recovered from the first gas-liquid heat exchanger sequentially flows through the heat transfer oil storage box and the biomass feedstock bin.

Further, the heat energies recovered from the low-temperature storage bin and the spray tower heat exchanger both flow toward the biomass feedstock bin.

Further, the new energy power generation system includes wind energy power generation systems and photovoltaic power generation systems.

When the purpose is to realize stable output of the electric energy of the new energy power generation, a bio-oil supplemented by the condensation system is further conveyed into the mixing device to be mixed with a bio-char from the low-temperature storage bin to prepare a slurry fuel and thus the unstable new energy power is converted into stable chemical energy in a clean fuel available to the thermal power generation unit for power generation. Further, based on requirements, it can be converted into a controllable electric energy which can be stably output to the power grid, so as to realize stable and continuous output of the new energy power generation. The low-temperature pyrolytic gas and the high-temperature pyrolytic gas are condensed and purified and then temporarily stored in the gas storage tank. As required by the system operation, the pyrolytic gas stored in the gas storage tank can be introduced into the power generation system of the internal combustion engine to provide energy for the microwave in the high-temperature pyrolysis device. The heat energy in the exhaust together with the high-temperature heat energy absorbed by the condensation system is used to supplement the heat energy required by the heat transfer oil storage box in the low-temperature pyrolysis device. The low-temperature heat source remaining after heat exchange is also used to dry and preheat the raw biomass feedstock in the biomass feedstock bin. Based on the energy level matching concept and the energy quality level, the electric energy, the high-temperature heat energy and the low-temperature heat energy are respectively recovered and reasonably used, so as to realize the cascade recovery and utilization of the energy in the cascade pyrolysis system.

When the purpose is to consume redundant electric energy of the new energy power generation, the high-temperature pyrolytic gas sequentially flows through high-temperature, medium-temperature and low-temperature condensation devices and then is temporarily stored in the gas storage tank, and the low-temperature pyrolytic gas is connected to the system through the medium-temperature condensation device. The light bio-oil in the low-temperature condensation device (the first gas-liquid heat exchanger) has higher oxygen content and water content, and can be used as crop-used wood vinegar after being filtered and rectified, or further hydrogenated to prepare an oxygen-containing fuel. The bio-oil in the medium-temperature condensation device (the second gas-liquid heat exchanger) has lower oxygen content and water content, and can be hydrogenated slightly to prepare an aromatic fuel. The required hydrogen all comes from an electrolysed water device driven by the new energy power. The heavy bio-oil in the high-temperature condensation device (spray tower heat exchanger) has a poorer fluidity but has a higher carbon content and a lower ash content, and can be recombined with activated carbon to prepare a high-quality electrochemical carbon. The bio-char in the low-temperature storage bin usually has a proper specific surface area and can be directly used as field-incorporated bio-char or further activated as adsorption-specific porous carbon.

There is further provided an energy storage method of the energy storage device for biomass cascade pyrolysis coupled with new energy power generation, which includes the following:

(1) Device startup stage: the electric energy supplied by the new energy power generation system is subjected to preheat the low-temperature pyrolysis device and the high-temperature pyrolysis device, and by electric heating, the heat transfer oil storage box is heated to 250 to 500° C.

(2) The raw biomass feedstock in the biomass feedstock bin is conveyed by the feedstock-conveying device to the low-temperature pyrolysis device for pre-pyrolysis, and the circulating heat transfer oil of the heat transfer oil storage box provides a heat source required for the pre-pyrolysis.

(3) The pre-pyrolysed char in the low-temperature pyrolysis device subsequently enters the high-temperature pyrolysis device for deep pyrolysis; where a temperature of the deep pyrolysis is 500 to 700° C.; the electric energy required by the high-temperature pyrolysis device is supplied by the new energy power generation system.

(4) The high-temperature pyrolytic gas and the low-temperature pyrolytic gas are stored in the gas storage tank after the bio-oil is separated out by condensation; after the energy storage device runs stably, the gas storage tank is connected to a burner for combustion based on requirements so as to supplement the heat energy and electric energy required by the low-temperature pyrolysis device and the high-temperature pyrolysis device; meanwhile, the heat energy is recovered from products to, based on different temperatures, supplement the low-temperature pyrolysis device and the biomass feedstock bin.

The present disclosure has the following beneficial effects.

(1) In the present disclosure, the biomass pyrolysis technology is creatively introduced into the new energy storage technology, and the biomass pyrolysis is driven by the new energy power generation so as to convert un-consumable redundant electric energy into stable chemical energy and store it in the pyrolytic products.

(2) In the present disclosure, the energy storage medium is a biomass, which has the advantages of low price, cleanness, safety and ease of use and the like, as compared with other energy storage modes.

(3) In the present disclosure, the pyrolysis method is a cascade pyrolysis formed by low-temperature and high-temperature pyrolysis. The low-temperature pyrolysis device features heating by heat energy, large heat transfer temperature difference and small desired heat exchange area; the high-temperature pyrolysis device features heating by microwave, and fast and convenient heating, and compared with the conventional pyrolysis device, shows compact structure and ease of startup and stop.

(4) In the present disclosure, the heat transfer oil is used to provide heat to the low-temperature pyrolysis device, achieving accurate temperature control. The jacket layer of the housing and the feed screw are hollow structures. When heating is performed inside and outside at the same time, the low-temperature heating rate can be increased; with the low-temperature pre-pyrolysis, the high-oxygen-content components which are difficult to carbonize are removed, saving the heating energy loss in the full process. The high-temperature pyrolysis device uses the microwave heating mode which performs heating from inside to outside. The housing is only wrapped with a heat insulation layer without adding a housing heating layer, reducing the equipment costs.

(5) In the present disclosure, the cascade pyrolysis mode can, based on energy level matching concept and the energy quality level, realize cascade recovery and utilization of energy in the pyrolysis system, increasing the entire efficiency of the pyrolysis system. The chemical energy in the pyrolytic gas is converted into electricity to supplement the energy required by the microwave of the high-temperature pyrolysis device. The high-temperature heat energy in the exhaust and products is recovered into the heat transfer oil storage box to supplement the heat required by the low-temperature pyrolysis device. The low-temperature heat energy in the exhaust and products enters the biomass feedstock bin to dry and preheat the raw biomass feedstock.

(6) Compared with the single purpose of the traditional energy storage mode, the biomass pyrolytic product for storing chemical energy in the present disclosure has multiple purposes, that is, it can be prepared as a clean fuel for combustion power generation and can also be converted into renewable chemicals.

Numerals of the drawings are described below:
1. biomass feedstock bin, 2. feedstock-conveying device, 3. first gas locker, 4. second gas locker, 5. low-temperature pyrolysis device, 6. heat transfer oil storage box, 7. high-temperature pyrolysis device, 8. high-temperature storage bin, 9. low-temperature storage bin, 10. first gas-liquid heat exchanger, 11. spray tower heat exchanger, 12. gas storage tank, 13. booster fan, 14. internal combustion engine, 15. power generator, 16. exhaust treatment device, 17. mixing device, 18. electrolysed water device, 19. second gas-liquid heat exchanger, 20. jacket layer, 21. low-temperature feed screw, 22. heat insulation layer, 23. high-temperature feed screw, and 24. microwave generator.

DETAILED DESCRIPTION OF THE EMBODIMENTS

Detailed descriptions will be made below to the technical solutions of the present disclosure in combination with drawings.

Figure 1:
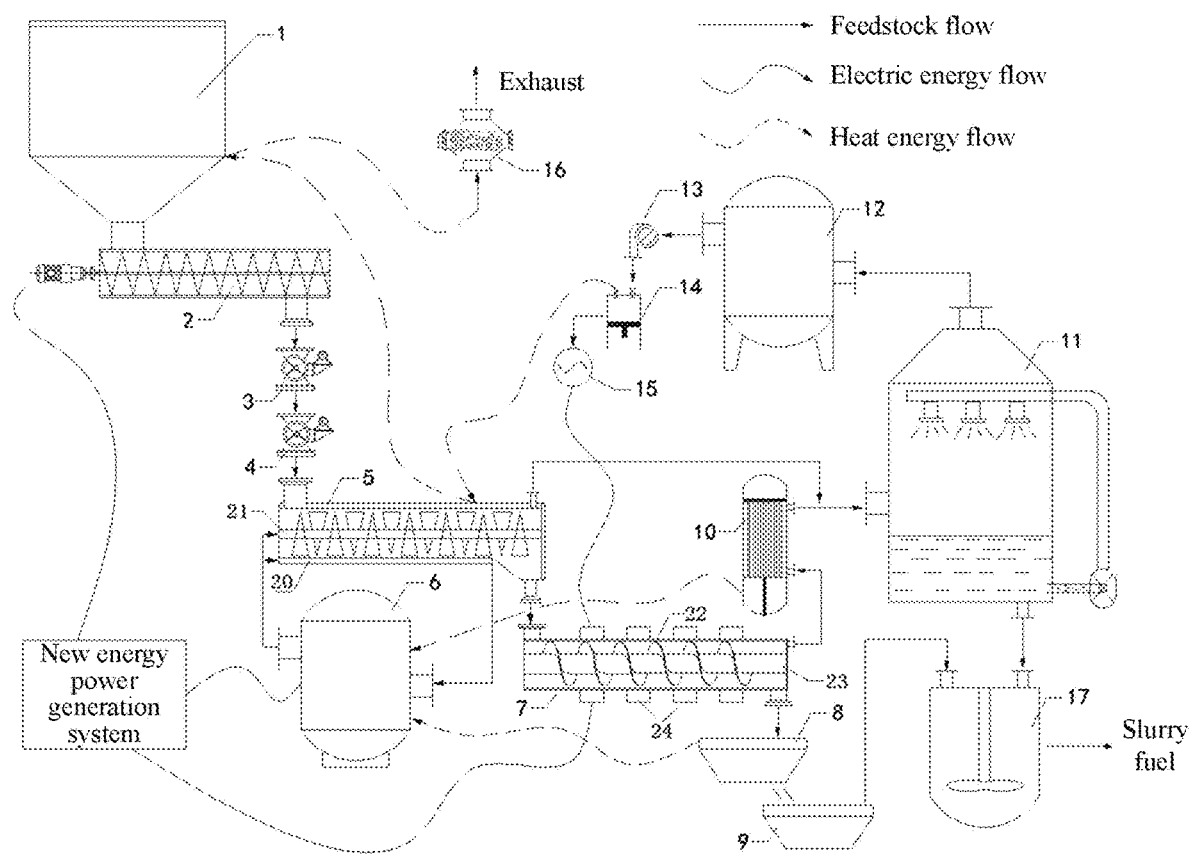
FIG. 1 is a structural schematic diagram of an embodiment 1 of the present disclosure.

As an embodiment 1 of the preferred solution, as shown in FIG. 1, it aims to convert the unstable new energy power generation into a stable clean fuel which is further used for thermal power generation, so as to realize stable and continuous output of the new energy power generation.

The embodiment 1 includes a feeding system, a cascade pyrolysis system, a post-treatment system and an output system. The feeding system includes a biomass feedstock bin 1, a feedstock-conveying device 2, a first gas locker 3 and a second gas locker 4. An outlet of the biomass feedstock bin 1 is connected with an inlet of the feedstock-conveying device 2, an outlet of the feedstock-conveying device 2 is connected with an inlet of the first gas locker 3, an outlet of the first gas locker 3 is connected with an inlet of the second gas locker 4, and an outlet of the second gas locker 4 is connected with an inlet of a low-temperature pyrolysis device 5.

The cascade pyrolysis system includes the low-temperature pyrolysis device 5, a heat transfer oil storage box 6, a high-temperature pyrolysis device 7, and bio-char storage bin (8 and 9). The low-temperature pyrolysis device 5 has a housing with a jacket layer, and a feed screw is disposed as a hollow structure along a central axis. The jacket layer and the feed screw are both connected with a heat transfer oil storage box 6 into which a circulating heat transfer oil is introduced to provide heat required for low-temperature pyrolysis. A cylindrical space between the housing and the feed screw is a feedstock layer. An inlet end of the housing of the low-temperature pyrolysis device 5 is connected with the second gas locker 4, and an outlet end of the housing has an upper outlet and a lower outlet. The upper outlet is a low-temperature pyrolytic gas outlet and the lower outlet is connected with an inlet of a high-temperature pyrolysis device 7 to discharge a low-temperature pre-pyrolysed char.

The high-temperature pyrolysis device 7 has a housing with a heat insulation layer, a microwave generator is embedded on an outer wall surface, and a feed screw is disposed along a central axis to advance the pyrolysis material. The outlet end of the housing of the high-temperature pyrolysis device 7 also has an upper outlet and a lower outlet, and the upper outlet is a high-temperature pyrolytic gas outlet and connected with the inlet of a first gas-liquid heat exchanger 10; the lower outlet is the bio-char storage bin (high-temperature storage bin 8) to discharge the bio-char. The output system includes a high-temperature storage bin 8, a low-temperature storage bin 9 and a mixing device 17. The high-temperature storage bin 8 is used to store a bio-char delivered by the high-temperature pyrolysis device and with a circulating nitrogen as heat exchange medium inside, recover and convey a high-temperature heat energy in the high-temperature bio-char to a heat transfer oil in the heat transfer oil storage box 6. When the bio-char is cooled down to a proper temperature, the char is discharged by the high-temperature storage bin 8 into the low-temperature storage bin 9. The low-temperature storage bin 9 is cooled down by air and the used air is input into the biomass feedstock bin 1 to dry and preheat a raw biomass feedstock.

The heat source of the heat transfer oil storage box comes from an electric energy of a new energy power generation system, an exhaust heat energy of a power generation system and a high-temperature heat energy recovered from a condensation system and the high-temperature storage bin 8.

The post-treatment system includes the condensation system and the power generation system. As shown in FIG. 1, the condensation system includes two stages of condensation devices formed by the first gas-liquid heat exchanger 10, a spray tower heat exchanger 11 and a gas storage tank 12. A liquid side of the first gas-liquid heat exchanger 10 is connected with the heat transfer oil storage box 6, a gas side inlet is connected with the high-temperature pyrolytic gas, and the heat in the high-temperature pyrolytic gas is recovered as the heat source of the low-temperature pyrolysis device 5. A gas side outlet is connected together with the low-temperature pyrolytic gas to a left gas inlet of the spray tower heat exchanger 11. A liquid outlet is disposed at the bottom of the spray tower heat exchanger 11, with a gas outlet at top. The spray tower heat exchanger 11 is internally provided with a spray layer, with a gas filtering device at top. The gas flows in a direction opposite to that of the spray liquid to strengthen condensation and supplementation effect. The non-condensable pyrolytic gas remaining after condensation is filtered and purified and then temporarily stored in the gas storage tank 12. The power generation system includes a booster fan 13, an internal combustion engine 14 and a power generator 15. The clean pyrolytic gas in the gas storage tank 12, based on requirements of the system, enters the internal combustion engine 14 for combustion power generation, and the generated power is used to supplement the energy required for the microwave of the high-temperature pyrolysis device 7. The exhaust discharged by the power generator 15 firstly runs through the heat transfer oil storage box 6 and the heat energy in the high-temperature exhaust is recovered and conveyed to the heat transfer oil in the heat transfer oil storage box 6. The heat-exchanged exhaust is introduced into the biomass feedstock bin 1 to dry and preheat the raw biomass feedstock, and finally is discharged after being treated by the exhaust treatment device 16. The mixing device 17 in the output system is used to receive the bio-char of the low-temperature storage bin 9 and a bio-oil cooled by the spray tower heat exchanger 11 and uniformly mix them to prepare a slurry fuel which is used as a clean fuel for thermal power generation based on system requirements, so as to realize continuous stable output of the new energy power generation, reducing the impact on the power grid.

The specific workflow of the embodiment 1 is described below:

The device startup stage: driven by the power of the new energy power generation system, the feedstock-conveying device 2 conveys the raw biomass in the biomass feedstock bin 1 through the first gas locker 3 and the second gas locker 4 into the low-temperature pyrolysis device 5. With the low-temperature pre-pyrolysis, the high-oxygen-content components which are difficult to carbonize are removed, saving the heating energy loss in the full process. The low-temperature pyrolysis process is heated by the heat transfer oil, realizing accurate temperature control. The desired heat energy is provided by the heat transfer oil storage box 6 heated by the electricity of the new energy power generation system, and the temperature of the heat transfer oil is controlled to 250 to 500° C. The low-temperature pre-pyrolysed char subsequently enters the high-temperature pyrolysis device 7 for deep pyrolysis, and the bio-char obtained enters the high-temperature storage bin 8 through the solid outlet.

The high-temperature pyrolytic gas firstly runs through the first gas-liquid heat exchanger 10 to recover the high-temperature heat energy for the low-temperature pyrolysis device 5, and then mixes with the low-temperature pyrolytic gas and enters the spray tower heat exchanger 11 and then a bio-oil is recovered by condensation. The non-condensable pyrolytic gas remaining after condensation is filtered and temporarily stored in the gas storage tank 12, and based on system requirements, enters the power generation device to generate electric energy so as to supplement the energy required for the high-temperature pyrolysis device 7. For the generated exhaust, the high-temperature heat energy is firstly recovered to the low-temperature pyrolysis device 5, and the low-temperature heat energy is then used to dry and preheat the raw biomass in the biomass feedstock bin 1. The bio-char storage bin also recovers the heat based on the same principle: the high-temperature heat energy in the high-temperature storage bin 8 is recovered to the low-temperature pyrolysis device 5 and the low-temperature heat energy in the low-temperature storage bin 9 is recovered to dry and preheat the raw biomass in the biomass feedstock bin 1. In this way, the cascade recovery and utilization of the energy in the pyrolysis system can be achieved. Based on the energy quality level, the electric energy of the highest quality level is used to supplement the energy required for the high-temperature microwave pyrolysis, the high-temperature heat energy is used for low-temperature pre-pyrolysis, and the low-temperature heat energy of the lowest quality level is used to dry the raw biomass, which fully reflects the principle of energy level matching and improves the energy recovery and utilization efficiency.

The cooled bio-char and the bio-oil are input into the mixing device 17 and then uniformly mixed to prepare a slurry fuel. Finally, the unstable electric energy generated by the new energy power generation system is converted into a stable chemical energy in the slurry fuel for use by the thermal power generation unit, so as to realize continuous, stable and controllable energy output.

Figure 2:
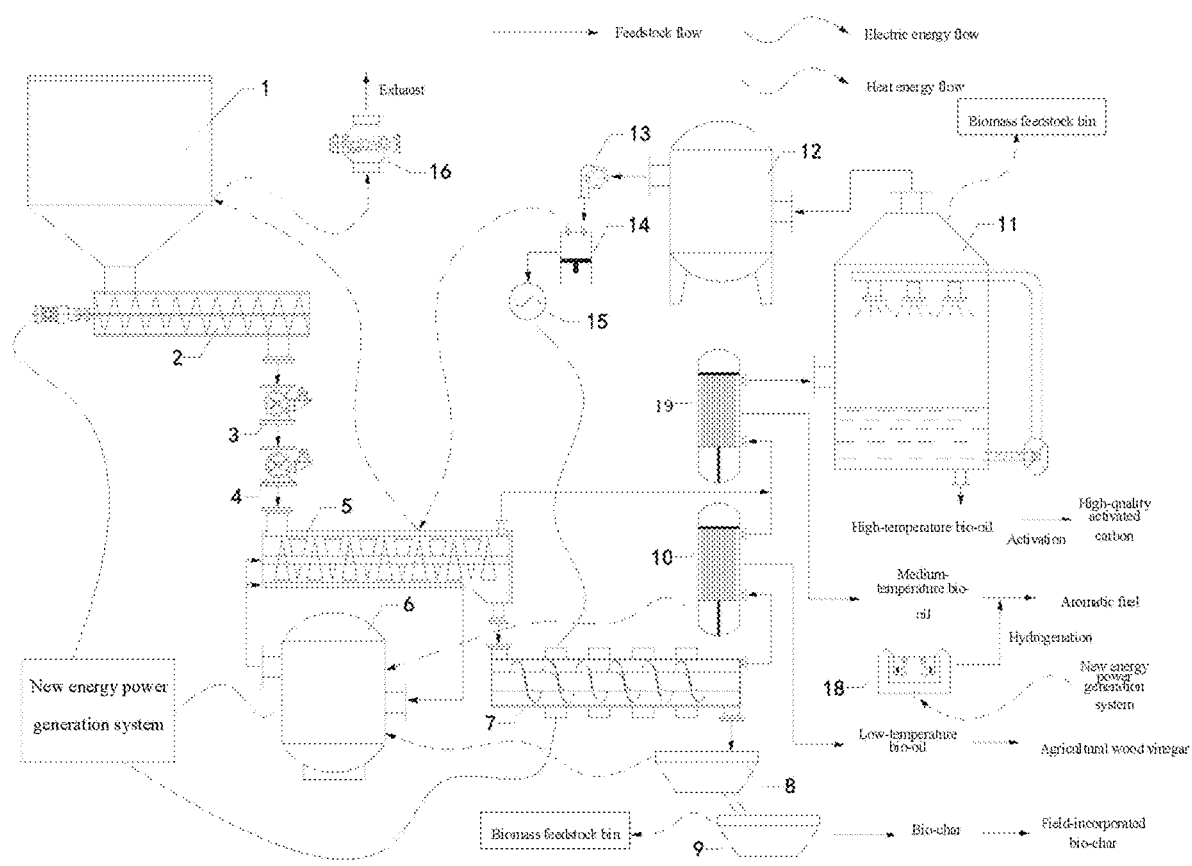
FIG. 2 is a structural schematic diagram of an embodiment 2 of the present disclosure.

As an embodiment 2 of the preferred solution, as shown in FIG. 2, it aims to convert non-consumable unstable redundant new energy power generation into a renewable chemical.

The embodiment 2 also includes a feeding system, a cascade pyrolysis system and a post-treatment system. The feeding system and the cascade pyrolysis system are the same as in the embodiment 1. The difference between the embodiments 1 and 2 is that in the embodiment 2, the condensation system in the post-treatment system uses three stages of condensation devices (10, 19 and 11); and the output system does not include the mixing device 17 but an electrolysed water device 18.

As shown in FIG. 2, the condensation system is formed by the first gas-liquid heat exchanger 10, the second gas-liquid heat exchanger 19, the spray tower heat exchanger 11 and the gas storage tank 12. The high-temperature pyrolytic gas generated by the high-temperature pyrolysis device 7 sequentially runs through the first gas-liquid heat exchanger 10, the second gas-liquid heat exchanger 19 and the spray tower heat exchanger 11. The low-temperature pyrolytic gas generated by the low-temperature pyrolysis device 5 is connected to the condensation system through the second gas-liquid heat exchanger 19 and runs through three stages of condensation devices to produce high-temperature, medium-temperature and low-temperature bio-oils respectively. A heat exchange of the first gas-liquid heat exchanger 10 is used to heat the heat transfer oil for the low-temperature pyrolysis device 5, and heat exchanges of the second gas-liquid heat exchanger 19 and the spray tower heat exchanger 11 are used to dry and preheat the raw biomass feedstock in the biomass feedstock bin 1. The non-condensable pyrolytic gas remaining after condensation is also filtered and purified and temporarily stored in the gas storage tank 12, and can be delivered to the power generation system based on system requirements. The electrolysed water device 18 generates hydrogen for hydrogenation of the medium-temperature bio-oil, and the required electric energy is supplied by the new energy power generation system.

The specific workflow of the embodiment 2 is described below.

The specific workflows of the feeding system and the cascade pyrolysis system are completely the same as in the embodiment 1.

The specific workflow of the post-treatment system is as follows: the high-temperature pyrolytic gas sequentially runs through the first gas-liquid heat exchanger 10, the second gas-liquid heat exchanger 19 and the spray tower heat exchanger 11, and the low-temperature pyrolytic gas is connected to the condensation system through the second gas-liquid heat exchanger 19 and runs through three stages of condensation devices to produce high-temperature, medium-temperature and low-temperature bio-oils respectively. The high-temperature bio-oil features poor fluidity, high carbon content and less impurities and can be used to subsequently prepare electrochemical high-quality activated carbon; the medium-temperature bio-oil which mainly includes phenol compounds features low oxygen content, good fluidity and can be slightly hydrogenated to prepare a high-energy-density aromatic fuel. The desired hydrogen is prepared by the electrolysed water device 18. The low-temperature bio-oil which mainly includes micro-molecular oxygen-containing compounds can be used agricultural wood vinegar to achieve the effect of ecological agricultural chemicals, soil conditioner and auxiliary foliar fertilizer. The bio-char in the low-temperature storage bin 9 has high porosity and retains most trace elements in the biomass and can be used as bio-char for field incorporation or porous carbon for adsorption.

In this way, the unstable electric energy generated by the new energy power generation system is finally converted into multiple high-value chemicals to be exported, so as to realize resource utilization of the stored chemical energy.

Figure 3:
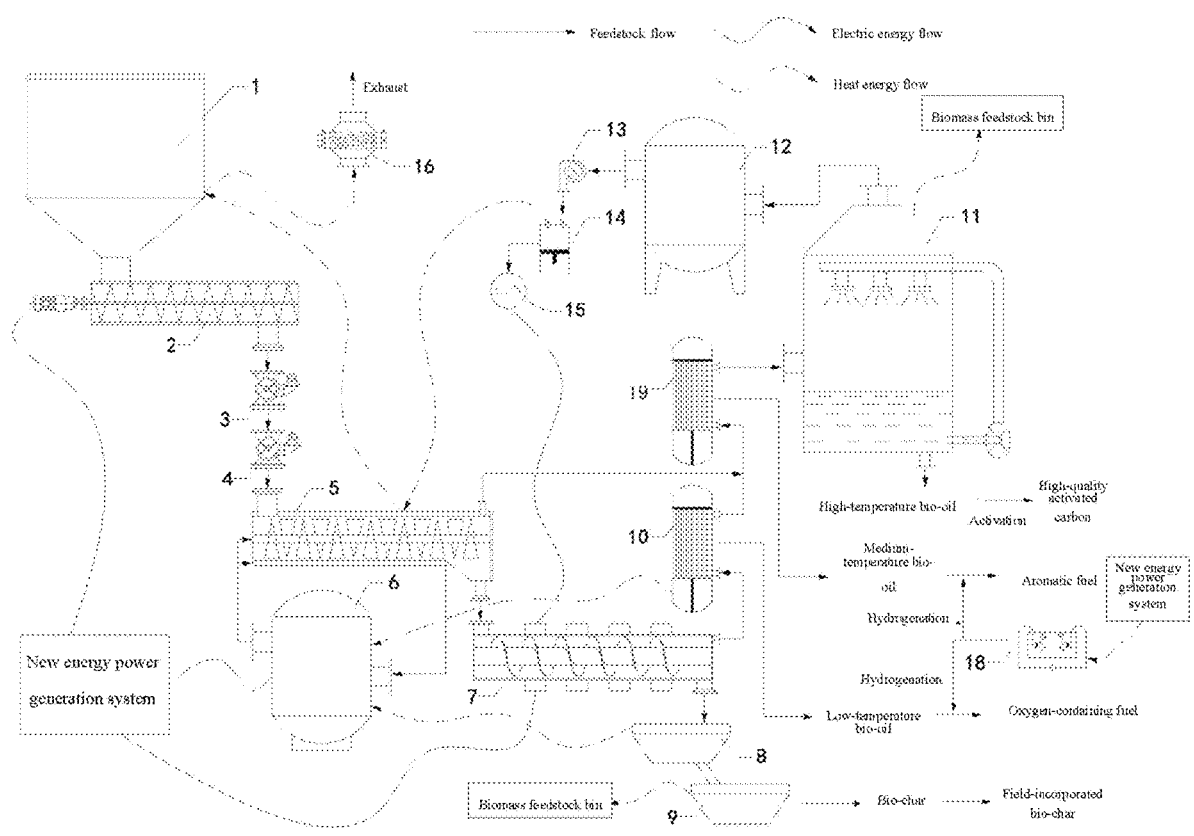
FIG. 3 is a structural schematic diagram of an embodiment 3 of the present disclosure.

As an embodiment 3 of the preferred solution, as shown in FIG. 3, it also aims to convert non-consumable, unstable and redundant new energy power generation into renewable fuels and chemicals.

The embodiment 3 also includes a feeding system, a cascade pyrolysis system and a post-treatment system. The feeding system and the cascade pyrolysis system are same as in the embodiment 1. The difference between the embodiments 3 and 1 is that in the embodiment 3, the hydrogen generated by the electrolysed water device 18 in the post-treatment system is supplied to the medium-temperature and low-temperature bio-oils for hydrogenation at the same time. The medium-temperature bio-oil is slightly hydrogenated to prepare a high-energy-density aromatic fuel; the low-temperature bio-oil is hydrogenated to prepare a micro-molecular oxygen-containing fuel as a clean fuel for multiple power machines, effectively reducing soot emission in the combustion process.

In the above solution, the unstable electric energy generated by the new energy power generation system is converted by cascade pyrolysis into a stable chemical energy stored in the biomass pyrolytic product, and resource or energy utilization of the stored chemical energy can be achieved by further conversion. It is to be noted that the above embodiments 1, 2 and 3 are preferred embodiments of the present disclosure. It should be pointed out that those non-creative improvements made by those persons of ordinary skill in the related arts without departing from the principle of the present disclosure shall all fall within the scope of protection of the present disclosure.

What is claimed is:

1. An energy storage device for biomass cascade pyrolysis coupled with new energy power generation, comprising a feeding system, a cascade pyrolysis system, a post-treatment system and an output system, wherein the feeding system comprises a biomass feedstock bin, a feedstock-conveying device, a first gas locker and a second gas locker sequentially connected;

the cascade pyrolysis system comprises a low-temperature pyrolysis device and a high-temperature pyrolysis device; the low-temperature pyrolysis device is connected with a heat transfer oil storage box, wherein a circulating heat transfer oil is introduced into the heat transfer oil storage box to provide heat required for low-temperature pyrolysis; wherein a heat source of the heat transfer oil storage box comes from an electric energy of a new energy power generation system, an exhaust heat energy of a power generation system and a high-temperature heat energy recovered from a condensation system and a high-temperature storage bin, comprising 1): the new energy power generation system heats the heat transfer oil storage box by electric heating; 2) an exhaust discharged by a power generator in the power generation system goes through the heat transfer oil storage box, and a heat energy in the high-temperature exhaust is recovered and transferred to the heat transfer oil in the heat transfer oil storage box; 3) a liquid side of a first gas-liquid heat exchanger in the condensation system is connected with the heat transfer oil storage box, and an inlet of a gas side is connected with a high-temperature pyrolytic gas to recover a heat in the high-temperature pyrolytic gas for the heat transfer oil storage box of the low-temperature pyrolysis device; 4) the high-temperature storage bin is configured to store bio-char delivered by the high-temperature pyrolysis device and with a circulating nitrogen introduced as a heat exchange medium inside, to recover and convey a high-temperature heat energy in the high-temperature bio-char to the heat transfer oil in the heat transfer oil storage box;

the post-treatment system comprises a condensation system, a power generation system, and an exhaust treatment device, and the power generation system comprises a booster fan, an internal combustion engine and a power generator;

the output system comprises a high-temperature storage bin and a low-temperature storage bin, and the high-temperature storage bin is configured to store the bio-char delivered by the high-temperature pyrolysis device and the pre-cooled bio-char is discharged by the high-temperature storage bin into the low-temperature storage bin; wherein an electric energy required by the high-temperature pyrolysis device is supplied by the new energy power generation system;

the electric energy required by various systems of the energy storage device for the biomass cascade pyrolysis is supplied by the new energy power generation system and comprises a mechanical energy, a heat energy and an electric energy required by various systems;

when the new energy power generation system aims to realize stable electric energy output, the energy storage device for the biomass cascade pyrolysis further comprises a mixing device, the condensation system comprises a first gas-liquid heat exchanger, a spray tower heat exchanger and a gas storage tank sequentially connected, a high-temperature pyrolytic gas outlet of the high-temperature pyrolysis device is connected with an inlet of the first gas-liquid heat exchanger, an outlet of the first gas-liquid heat exchanger and a low-temperature pyrolytic gas outlet of the low-temperature pyrolysis device are both connected with an inlet of the spray tower heat exchanger, and the mixing device mixes a bio-oil captured by the condensation system with the bio-char from the low-temperature storage bin to prepare a slurry fuel;

when the new energy power generation system aims to consume redundant electric energy, the energy storage device for the biomass cascade pyrolysis further comprises a hydrogen making device, the condensation system comprises a first gas-liquid heat exchanger, a second gas-liquid heat exchanger, a spray tower heat exchanger and a gas storage tank sequentially connected, the high-temperature pyrolytic gas outlet of the high-temperature pyrolysis device is connected with the inlet of the first gas-liquid heat exchanger, the low-temperature pyrolytic gas outlet of the low-temperature pyrolysis device is connected with an inlet of the second gas-liquid heat exchanger, an outlet of the second gas-liquid heat exchanger is connected with the inlet of the spray tower heat exchanger, the high-temperature pyrolytic gas of the high-temperature pyrolysis device sequentially runs through the first gas-liquid heat exchanger, the second gas-liquid heat exchanger, and the spray tower heat exchanger to produce low-temperature, medium-temperature and high-temperature bio-oils by three-stages condensation mode, the low-temperature pyrolytic gas of the low-temperature pyrolysis device is connected to the condensation system through the second gas-liquid heat exchanger to produce the medium-temperature and high-temperature bio-oils sequentially by condensation, the medium-temperature and low-temperature bio-oils produce corresponding products by hydrogen added by the hydrogen making device, and the high-temperature bio-oil is configured to subsequently prepare an electrochemical high-quality activated carbon;

a bottom liquid outlet of the spray tower heat exchanger is configured to output a condensed bio-oil, and a top gas outlet is connected with the gas storage tank; an outlet of the gas storage tank is connected with an inlet of the booster fan; an outlet of the booster fan is connected with the internal combustion engine; the internal combustion engine is connected with the power generator; the power generator supplies power to the high-temperature pyrolysis device;

an exhaust of the internal combustion engine sequentially flows through the low-temperature pyrolysis device and the biomass feedstock bin for recovery of heat energy in the exhaust and is discharged after being treated by the exhaust treatment device;

wherein a heat exchange amount of the first gas-liquid heat exchanger in the condensation system is configured to heat the heat transfer oil for use by the low-temperature pyrolysis device, and heat exchange amounts of the second gas-liquid heat exchanger and the spray tower heat exchanger are configured to dry and preheat a raw biomass in the biomass feedstock bin.

2. The energy storage device for the biomass cascade pyrolysis according to claim 1, wherein the feeding system is configured to convey the raw biomass to the low-temperature pyrolysis device, and the second gas locker is connected with an inlet of the low-temperature pyrolysis device.

3. The energy storage device for the biomass cascade pyrolysis according to claim 1, wherein the low-temperature pyrolysis device has a housing with a jacket layer, and a low-temperature feed screw is disposed along a central axis; an inlet end of the housing is connected with the second gas locker, an outlet end of the housing has an upper outlet and a lower outlet, the upper outlet is a low-temperature pyrolytic gas outlet and connected with an inlet of the condensation system; the lower outlet is a low-temperature bio-char outlet and connected with an inlet of the high-temperature pyrolysis device; the low-temperature feed screw and the jacket layer are both hollow structures, and both ends of the low-temperature feed screw and the jacket layer are respectively connected to inlet and outlet of the heat transfer oil storage box to introduce the circulating heat transfer oil.

4. The energy storage device for the biomass cascade pyrolysis according to claim 1, wherein the high-temperature pyrolysis device has a housing with a heat insulation layer, a microwave generator is embedded on an outer wall surface, and a high-temperature feed screw is disposed along a central axis; an electric energy required for the microwave generator is supplied by the power generator of the post-treatment system and the new energy power generation system; an inlet end of the housing is connected with a low-temperature bio-char outlet below the low-temperature pyrolysis device, an outlet end of the housing has an upper outlet and a lower outlet, and the upper outlet is a high-temperature pyrolytic gas outlet and connected with the inlet of the condensation system; the lower outlet is a bio-char outlet and connected with the high-temperature storage bin.

5. The energy storage device for the biomass cascade pyrolysis according to claim 1, wherein a high-temperature heat energy recovered from the high-temperature storage bin flows toward the heat transfer oil storage box and the biomass feedstock bin, and a low-temperature heat energy recovered from the low-temperature storage bin flows toward the biomass feedstock bin.

6. The energy storage device for the biomass cascade pyrolysis according to claim 1, wherein the new energy power generation system comprises wind energy power generation systems and photovoltaic power generation systems.

7. An energy storage method of an energy storage device for biomass cascade pyrolysis coupled with new energy power generation, wherein the energy storage device for the biomass cascade pyrolysis comprises a feeding system, a cascade pyrolysis system, a post-treatment system and an output system, wherein the feeding system comprises a biomass feedstock bin, a feedstock-conveying device, a first gas locker and a second gas locker sequentially connected;

the cascade pyrolysis system comprises a low-temperature pyrolysis device and a high-temperature pyrolysis device, and the low-temperature pyrolysis device is connected with a heat transfer oil storage box;

the post-treatment system comprises a condensation system, a power generation system and an exhaust treatment device, the power generation system comprises a booster fan, an internal combustion engine and a power generator;

the output system comprises a high-temperature storage bin and a low-temperature storage bin, the high-temperature storage bin is configured to store bio-char delivered by the high-temperature pyrolysis device and discharge the pre-cooled bio-char into the low-temperature storage bin, wherein an electric energy required by various systems of the energy storage device for the biomass cascade pyrolysis is supplied by a new energy power generation system;

when the new energy power generation system aims to realize stable electric energy output, the energy storage device for the biomass cascade pyrolysis further comprises a mixing device; the condensation system comprises a first gas-liquid heat exchanger, a spray tower heat exchanger and a gas storage tank sequentially connected; a high-temperature pyrolytic gas outlet of the high-temperature pyrolysis device is connected with an inlet of the first gas-liquid heat exchanger, an outlet of the first gas-liquid heat exchanger and a low-temperature pyrolytic gas outlet of the low-temperature pyrolysis device are both connected with an inlet of the spray tower heat exchanger, and the mixing device mixes a bio-oil captured by the condensation system with the bio-char from the low-temperature storage bin to prepare a slurry fuel;

when the new energy power generation system aims to consume redundant electric energy, the energy storage device for the biomass cascade pyrolysis further comprises a hydrogen making device, the condensation system comprises a first gas-liquid heat exchanger, a second gas-liquid heat exchanger, a spray tower heat exchanger and a gas storage tank sequentially connected; the high-temperature pyrolytic gas outlet of the high-temperature pyrolysis device is connected with the inlet of the first gas-liquid heat exchanger; the low-temperature pyrolytic gas outlet of the low-temperature pyrolysis device is connected with an inlet of the second gas-liquid heat exchanger, an outlet of the second gas-liquid heat exchanger is connected with the inlet of the spray tower heat exchanger; the high-temperature pyrolytic gas of the high-temperature pyrolysis device sequentially runs through the first gas-liquid heat exchanger, the second gas-liquid heat exchanger, and the spray tower heat exchanger to produce low-temperature, medium-temperature and high-temperature bio-oils by three-stages condensation mode; the low-temperature pyrolytic gas of the low-temperature pyrolysis device is connected to the condensation system through the second gas-liquid heat exchanger to produce the medium-temperature and high-temperature bio-oils sequentially by condensation, the medium-temperature and low-temperature bio-oils produce corresponding products by hydrogen added by the hydrogen making device, and the high-temperature bio-oil is configured to subsequently prepare an electrochemical high-quality activated carbon;

a bottom liquid outlet of the spray tower heat exchanger is configured to output a condensed bio-oil, and a top gas outlet is connected with the gas storage tank; an outlet of the gas storage tank is connected with an inlet of the booster fan; an outlet of the booster fan is connected with the internal combustion engine; the internal combustion engine is connected with the power generator; the power generator supplies power to the high-temperature pyrolysis device;

an exhaust of the internal combustion engine sequentially flows through the low-temperature pyrolysis device and the biomass feedstock bin for recovery of heat energy in the exhaust and finally is discharged after being treated by the exhaust treatment device;

wherein a heat exchange amount of the first gas-liquid heat exchanger in the condensation system is configured to heat the heat transfer oil for use by the low-temperature pyrolysis device, and heat exchange amounts of the second gas-liquid heat exchanger and the spray tower heat exchanger are configured to dry and preheat a raw biomass in the biomass feedstock bin; the energy storage method comprises the following steps:

1) device startup stage: subjecting the electric energy supplied by the new energy power generation system to preheat the low-temperature pyrolysis device and the high-temperature pyrolysis device, wherein by electric heating, the heat transfer oil storage box is heated to 250 to 500° C.; wherein the low-temperature pyrolysis device is connected with the heat transfer oil storage box and a circulating heat transfer oil is introduced to the heat transfer oil storage box to provide heat required for low-temperature pyrolysis;

2) conveying the raw biomass in the biomass feedstock bin by the feedstock-conveying device to the low-temperature pyrolysis device for pre-pyrolysis, wherein the circulating heat transfer oil of the heat transfer oil storage box provides a heat source required for the pre-pyrolysis; wherein the heat source of the heat transfer oil storage box comes from the electric energy of the new energy power generation system, the exhaust heat energy of the power generation system, and the high-temperature heat energy recovered from the condensation system and the high-temperature storage bin, comprising the followings: 2.1) heating the heat transfer oil storage box by electric heating of the new energy power generation system; 2.2) subjecting the exhaust discharged by the power generator of the power generation system to run through the heat transfer oil storage box, and recovering and transferring the heat energy in the high-temperature exhaust to the heat transfer oil in the heat transfer oil storage box; 2.3) connecting a liquid side of the first gas-liquid heat exchanger in the condensation system with the heat transfer oil storage box, connecting a gas side inlet with the high-temperature pyrolytic gas, and recovering heat in the high-temperature pyrolytic gas for the heat transfer oil storage box in the low-temperature pyrolysis device; 2.4) configuring the high-temperature storage bin to store a bio-char delivered by the high-temperature pyrolysis device, and with circulating nitrogen as a heat exchange medium inside, recovering and transferring the high-temperature heat energy in the high-temperature bio-char to the heat transfer oil in the heat transfer oil storage box;

3) subjecting a pre-pyrolysed char in the low-temperature pyrolysis device subsequently to enter the high-temperature pyrolysis device for deep pyrolysis, wherein a temperature of the deep pyrolysis is 500 to 700° C.; the electric energy required by the high-temperature pyrolysis device is supplied by the new energy power generation system;

4) storing the high-temperature pyrolytic gas and the low-temperature pyrolytic gas in the gas storage tank after the bio-oil is separated out by condensation; after the energy storage device for the biomass cascade pyrolysis runs stably, connecting the gas storage tank to a burner for combustion based on requirements to supplement the heat energy and electric energy required by the low-temperature pyrolysis device and the high-temperature pyrolysis device; meanwhile, recovering the heat energy from products to, based on different temperatures, supplement the heat required by the low-temperature pyrolysis device and the biomass feedstock bin; wherein a heat exchange amount of the first gas-liquid heat exchanger in the condensation system is configured to heat the heat transfer oil for use by the low-temperature pyrolysis device, and heat exchange amounts of the second gas-liquid heat exchanger and the spray tower heat exchanger are configured to dry and preheat a raw biomass in the biomass feedstock bin.

\* \* \* \* \*